United States Patent Office 3,450,648
Patented June 17, 1969

3,450,648
**PROCESS OF PRODUCING CELLULAR POLYURE-
THANES EMPLOYING TERTIARY AMINES AND
CERTAIN ORGANIC METALLIC COMPOUNDS
AS CATALYST SYSTEM**
Erwin Windemuth, Leverkusen, and Franzkarl Brochhagen, Odenthal, Germany, assignors to Farbenfabriken Bayer Aktiengesellschaft, Leverkusen, Germany, a corporation of Germany
No Drawing. Continuation of application Ser. No. 678,437, Aug. 15, 1957. This application Nov. 13, 1967, Ser. No. 685,711
Int. Cl. C08g 22/44
U.S. Cl. 260—2.5        12 Claims

ABSTRACT OF THE DISCLOSURE

Cellular polyurethanes are prepared by reacting an organic polyisocyanate, water and an organic compound containing at least two active hydrogen containing groups in the presence of a catalytic amount of a basic organic reaction accelerator and a non-basic organic metallic compound which is at least partially soluble in one of said reactants, for example N-diethyl-ethanolamine or bis-(diethyl ethanol amine) adipate and ferric acetyl acetonate, titanium tetrabutylate, iron cyclopentadienyl, mercury acetate, or the copper salt of phthalic acid monobutylester.

---

This application is a continuation of Ser. No. 678,437 filed Aug. 15, 1957, now abandoned, which in turn is a continuation-in-part of Ser. No. 449,010, filed Aug. 10, 1954, now abandoned.

This invention relates to an improved process for the manufacture of porous polyurethane plastics of rigid, semi-rigid or elastic consistency. The application is a continuation-in-part of our co-pending application of Ser. No. 449,010 filed Aug. 10, 1954 now abandoned.

It has been proposed before to make cellular polyurethane plastics or, in other words, polyurethane foam by reacting a compound containing reactive hydrogen with a polyisocyanate and a small amount of water in the presence of suitable activators. Among the compounds containing reactive hydrogen which are generally used in the production of polyurethane foam, there may be mentioned linear and branched polyesters and polyester amides, polyalkylene ether glycols and polyalkylene etherthioether glycols, all of which contain terminal hydroxyl and/or carboxyl groups and have an average molecular weight above about 1,000. As polyisocyanate reactant, there may be used an aliphatic or aromatic polyisocyanate but it is preferred to employ aromatic polyisocyanates, such as the phenylene-, toluylene- and naphthylenediisocyanates, or diisocyanates containing in their molecule two aromatic rings linked through a CH$_2$—, CO—, SO$_2$— or N$_2$ bridge, each of the aromatic rings bearing one isocyanato group. As activators there are commonly used tertiary amines and/or emulsifiers. If desired, fillers and other additives may be incorporated in the foamable mixture.

In producing a polyurethane foam from the above components, they may be brought together in different ways. Thus, it is possible to mix the compound containing the reactive hydrogen with the required amount of water and the activator and to subsequently add the polyisocyanate in order to form the polyisocyanate foam. It is also possible to introduce the three components, i.e., the compound containing reactive hydrogen, the polyisocyanate and water, through separate conduits into a mixing chamber. In both instances, it is preferred to inject at least one of the components into a stream of the other component in order to bring about good mixing (see U.S. Patent 2,764,565). Alternatively, the compound containing reactive hydrogen may be reacted with excess polyisocyanate to produce an isocyanate-modified intermediate which is subsequently mixed with an aqueous activator mixture and, if desired, additional component containing reactive hydrogen to produce the polyurethane foam (see German Patent 929,507).

In accordance with the present invention it has been found that cellular foamed polyurethane plastics of superior physical characteristics are obtained by reacting a compound containing reactive hydrogen with a polyisocyanate in the presence of a basic reaction accelerator and a metallic compound of non-basic nature which is at least partially soluble in one of the reactants.

The metallic compound can be added to anyone of the components i.e. polyhydroxy and/or carboxylic compound, polyisocyanate or reaction accelerator. Before the components are brought together, however, it is also possible to add the metallic compound of non-basic nature to a previously prepared mixture of the components or the catalyst and other components may be mixed together simultaneously. If the production of the polyurethane foam is effected in two or more steps the metallic compound can be added in anyone of these steps. That is, the metallic compound need not be present in all the process steps to obtain the desired acceleration.

Metallic compounds of non-basic nature which are at least partially soluble in one of the reactants are inter alia complex compounds prepared from β-keto-carboxylic acid esters such as aceto acetic acid esters or cyclopentanone carboxylic acid esters, or β-diketones e.g. acetyl acetone or benzoyl acetone, and titanium, zirconium, lead, vanadium, antimony, bismuth, tin, chromium, manganese, iron, cobalt, nickel, copper, gold, zinc, cadmium, osmium, mercury, and uranium. It is possible to have inorganic radicals within the complex molecule. To give some examples, TiCl$_2$(C$_5$H$_7$O$_2$)$_2$; SnCl$_2$(C$_5$H$_7$O$_2$)$_2$; SbCl$_4$(C$_5$H$_7$O$_2$); and VO(C$_5$H$_7$O$_2$)$_2$ are useful as metallic compounds within the scope of the present invention. Furthermore, alkyl and alkoxy compounds of the above metals such as titanium tetrabutylate and titanium dichloride diethyl or iron cyclopentadienyl are as well suited for the present process as their salts with mono- or polycarboxylic acids or partial esterification products thereof. Such metallic compounds are mercury acetate or the copper salt of the phthalic acid monobutylester.

Usually, the metallic compound is added to one of the reactants. However, it is preferred to add the metallic compound to the compound containing active hydrogen atoms. If the compound containing active hydrogen is for instance a polyester or a polyether it is possible to add the metallic compound even in the esterification or etherification step respectively. In such a case, it is possible to employ the above-cited metal compounds. Of course, the metallic compounds of the present invention can be used in mixture.

The metallic compounds of non-basic character are effective in very small amounts. In general, 0.00001–0.1% by weight of metal based on the total weight of the reactants will suffice to bring about the desired catalytic effect.

The use of the above-defined metallic compounds in combination with basic reaction accelerators has proved to be highly advantageous in the manufacture of either rigid or elastic cellular foamed plastics. The foamed plastics exhibit superior physical characteristics as compared with those plastics prepared in the presence of a basic reaction accelerator alone. The products have marked tensile strength and show no cracking. Cellular materials prepared under similar conditions but in the absence of the metallic compound of the invention tend to show cracking. The amount of waste material in the technical grade production is considerably reduced when following the procedure of the present invention.

It is possible to produce, by the process of the invention, low density cellular foamed plastics which possess superior physical characteristics such as were hitherto obtainable only in cellular materials of higher density. In particular the cellular foamed products obtainable by the process of this invention are distinguished by the fact that their pore structure is almost completely closed; this property results, inter alia, in diminished absorption of water and improved heat insulating capacity. In addition, the danger of cracking in the manufacture of large blocks is practically eliminated.

The outstanding properties of the cellular foamed plastics produced in accordance with this invention are very probably due to the action of the non-basic metallic compounds, which, in addition to the basic materials that accelerate the formation of urethane- or carbamide-linkages and the evolution of carbon dioxide, promote the formation of urethane and/or carbamide groups in the basic structure of the foam.

Cellular foamed plastics of especially good properties are obtained by carrying out the process of the present invention and adopting the methods or utilizing the apparatus disclosed in U.S. Patent 2,764,565, which patent is incorporated by reference in the present specification.

EXAMPLE 1

A polyester derived from 175.2 parts of adipic acid, 128.2 parts of diethylene glycol and 8.1 parts of trimethylol propane is mixed with 0.1% of ferric acetyl acetonate at 80° C. 100 parts of the mixture thus obtained is reacted while stirring with 25 parts of toluylene diisocyanate and 7 parts of a basic reacting mixture consisting of 3 parts of the adipic acid ester of N-diethylethanolamine, 2 parts of an emulsifier (diethylamine oleate) and 1.2 parts of water. An elastic foamed product of excellent physical properties having a density of 80 kg./m.$^3$ and a tensile strength of 1.9 kg./cm.$^2$ at 200% elongation is obtained.

EXAMPLE 2

1% of iron cyclopentanone carboxylic acid ethyl ester is incorporated with stirring at 80° C. in a polyester derived from 175.2 parts of adipic acid, 128.2 parts of diethylene glycol and 8.1 parts of trimethylol propane. 100 parts of the mixture thus obtained are intimately mixed with 31 parts of toluylene diisocyanate and left standing at 80° C. for 5 minutes. Then 10 parts of the basic-reacting mixture of Example 1 are added. By working up in the usual manner a cellular foamed plastic results having a density of 50 kg./m.$^3$ and a tearing strength of 0.8 kg./cm. The product has marked tensile strength and shows no cracking. A cellular material prepared under similar conditions but in the absence of iron compounds shows cracking.

EXAMPLE 3

A polyester prepared from 15 mols of adipic acid, 16 mols of diethylene glycol and 1 mol of trimethylol propane (OH number 55, acid number 1) is fed continuously to the reaction or mixing device described in U.S. Patent 2,764,565. The polyester contains 5 mg. of titanium tetrabutylate for each 100 g. of polyester. An activator mixture consisting of 3 parts of bis-(diethyl ethanol amine)-adipate, 1 part of diethyl amine oleate, 0.75 part of sulfonated castor oil (water content 55%), and 1.5 parts of water, and toluylene diisocyanate are intermittently injected into the stream of the polyester. 37 parts of toluylene diisocyanate and 9 parts of activator mixture are employed for each 100 parts of polyester.

Following the procedure of U.S. Patent 2,764,565 a polyurethane foam is obtained having a tensile strength of 1.6 kg./cm.$^2$ at 180% elongation. If the same foam formulation is used without addition of titanium the resulting foam has a tensile strength of 1.2 kg./cm.$^2$ at 130% elongation.

EXAMPLE 4

A polyester prepared from adipic acid and diethylene glycol (OH number 50) is mixed at 70° C. with 0.5% of the copper salt of phthalic acid monobutylester. To 100 parts of this mixture are added 37 parts of toluylene diisocyanate and 9 parts of a basic accelerator mixture consisting of 3 parts of bis-(diethyl ethanol amine)-adipate, 1 part of diethyl amine oleate, 1.5 parts of sulfonated castor oil (water content 54%), and 0.2 part of paraffin oil. A smooth foam having a density of 50 kg./m.$^3$ is obtained having an unique pore structure. The foam does not show any tendency to cracking.

EXAMPLE 5

A polyester of the composition as described in Example 1 is mixed at 80° C. with 0.1% of titanium diethyl dichloride. 100 parts of this mixture are mixed with 47 parts of toluylene diisocyanate and 10 parts of a basic accelerator mixture consisting of 3 parts of bis-(diethyl ethanol amine)-adipate, 1 part of diethyl amine oleate, 2 parts of sulfonated castor oil (water content 54%), 2 parts of sulfonated ricinoleic acid (water content 54%), 1 part of water and 0.4 part of paraffin oil.

An elastic foam having a density of 35 kg./m.$^3$ is obtained. The foam does not show any cracking. If the same formulation is used but omitting the titanium diethyl dichloride most of the foamed blocks do show cracking.

EXAMPLE 6

1000 parts of a polypropylene glycol having an average molecular weight of 2000, a hydroxyl number of 56 and a viscosity of 42.4 cps./75° C. are mixed with 0.25 part of benzoyl chloride and 0.1 part of ferric acetyl acetonate dissolved in 5 parts of benzene. The mixture is heated to 80° C. while stirring. At this temperature 131 parts of toluylene dissocyanate (65:35) are added. After 30 minutes a further amount of 131 parts of toluylene diisocyanate is added and the mixture cooled down to 80° C. The prepolymer thus prepared contains 6.2% NCO and has a viscosity of 12230 cps./25° C.

100 parts of that prepolymer are mixed with a mixture of 2.3 parts of N,N-dimethyl-3-ethoxypropylamine, 3 parts of sulfonated castor oil (water content 54%) and 0.5 part of water. A very smooth foam is obtained thereby having a bulk density of about 60 kg./m.$^3$ and exhibiting outstanding resistance to ageing.

Illustrative examples of polyhydroxy compounds which may be used in the practice of this invention are polyesters containing hydroxyl groups, polyalkylene thioether glycols, polyalkylene ether glycols obtained by polymerization of polyalkylene oxides or by addition of alkylene oxides to polyhydric alcohols, polyamines or alkanolamines, polyhydroxy compounds obtained by polymerization of olefines, and carbon monoxide with subsequent hydrogenation of the oxo compound primarily obtained, further polyester amides obtained by polycondensation of dicarboxylic acids, polyhydric alcohols and diamines.

Polyesters which may be used according to the invention comprise those derived from the following polyhydric alcohols: ethylene glycol, diethylene glycol, triethylene glycol, pentamethylene glycol, hexamethylene glycol, decamethylene glycol, dodecamethylene glycol, propylene glycol, 1,2-propylene glycol, 1,3-propylene glycol, trimethylene glycol, butanediol-1,2, butanediol-2,3, butanediol-1,3, butanediol-1,4, isobutylene glycol, pinacol, hexanediol-1,4, pentanediol-1,5, 2-methyl-2,4-pentanediol, heptanediol-1,7, heptanediol-1,4, thiodiglycol, n-butyldiethanolamine, N,N-diethanol aniline, hydroquinone diglycol ether, transhexahydroxylylene glycol, m-dihydroxybenzene, o-dihydroxybenzene, glycerol, 1,1,1-trimethylol propane, trihydroxybenzene, castor oil, erythritol, pentaerythritol, triethanolamine and mannitol, etc.

These polyhydric alcohols may be reacted with the following polycarboxylic acids to form the polyesters: adipic, β-methyl adipic, azelaic, fumaric, glutaric, 2-phenylglutaric, maleic, maleic, malonic, methyl malonic, sebacic, suberic, succinic, pimelic, 4-ketopimelic, itaconic, dehydromuconic, decane-1, 10-dicarboxylic, undecanedioic, keto-undecanedioic, brassylic, acetylene dicarboxylic, acetone dicarboxylic, diphenic, p-penylene diacetic, phthalic, isophthalic, terephthalic, hexahydroterephthalic, cyclopentane-1,2-dicarboxylic, cyclopentane-1,3-dicarboxylic, cyclohexane, 1,2-dicarbocylic, cyclohexane - 1,3 - dicarboxylic, cyclohexane - 1,4-dicarboxylic, naphthalene-1,2-dicarboxylic, naphthalene-1,3-dicarboxylic, naphthalene-1,4-dicarboxylic, naphthalene-1,5-dicarboxylic, diphenylene-2,2-dicarboxylic, diphenylene - 4,4' - dicarboxylic, diphenylene-2,4'-dicarboxylic, xylylene - 1,4 - dicarboxylic, xylylene-1,3-dicarboxylic, xylylene-1,2-dicarboxylic, camphoric, citric, tricarballylic and aconitic acids, etc.

Polyesters from hydroxycarboxylic acids may also be used in the practice of this invention. Illustrative examples of the polyesters obtained from 6-hydroxycaproic, 10 - hydroxydecanoic, 12-hydroxystearic, 9,10-dihydroxystearic acid, 3,12-dihydroxy-palmitic acid, trihydroxy n-butyric acids, trihydroxy isobutyric acid and aleuritic acid, etc.

Any polyisocyanate may be employed in the practice of the instant invention. Illustrative examples of these are trimethylene diisocyanate, tetramethylene diisocyanate, pentamethylene diisocyanate, hexamethylene diisocyanate, decamethylene diisocyanate, cyclopentylene-1,3-diisocyanate, 1,4-diisocyanato cyclohexane, p-phenylene diisocyanate, m-phenylene diisocyanate, toluylene diisocyanates, naphthalene diisocyanates, 4,4'-diphenyl propane diisocyanate, 4,4'-diphenylmethane diisocyanate, benzene-1,3,5-triisocyanate, toluene-2,4,6-triisocyanate, ethylbenzene-2,4,6-triisocyanate, monochlorobenzene-2,4,6-triisocyanate, triphenylmethane-4,4',4''-triisocyanate and diphenyl-2,4,4'-triisocyanate, etc.

Suitable basic reaction accelerators are those previously used in the reaction of a polyhydroxy- and/or polycarboxyl compound with a polyisocyanate. Tertiary amines such as hexahydrodimethyl aniline, or carboxylic acid esters of dialkyl ethanol amines, are especially suitable, but other basic reaction accelerators may be employed. The basic reaction accelerator is employed either concurrently with the metallic compound or at a later stage.

The present invention is applicable to the production of polyurethane foams of all kinds. A rather substantial volume of literature has developed in the last ten years or so in connection with the production of polyurethane foam of which among the earliest are a book entitled, "German Plastics Practice," by De Bell et al. (1946), pp. 316 and 463 to 465, and the articles by Otto Bayer in "Angew. Chemie," A 59, 257 (1947) and "Modern Plastics," 24, 149 (1947). However, in order to provide sufficient detail with respect to specific starting materials that are especially useful to make polyurethane foam and at the same time achieve a certain degree of brevity herein, reference is made to the aforesaid U.S. Patent 2,764,565 and German Patent 929,507, the disclosure of which is hereby incorporated herein by reference.

While certain representative embodiments and details have been shown for the purpose of illustrating this invention, it will be apparent to those skilled in the art that various changes and modifications may be made therein without departing from the spirit and scope of the invention.

What is claimed is:

1. In a process for the preparation of cellular polyurethane plastics by a process which comprises reacting an organic polyisocyanate, water and an organic compound containing at least two active hydrogen-containing groups, said active hydrogen-containing groups being reactive with an organic polyisocyanate to prepare polyurethane plastics, the improvement which comprises effecting the reaction with water in the presence of a catalytic amount of (A) a tertiary amine and (B) a material which is at least partially soluble in one of said reactants and selected from the group consisting of:
   (1) ferric acetyl acetonate;
   (2) iron cyclopentanone carboxylic acid ethyl ester;
   (3) $TiCl_2(C_5H_7O_2)_2$;
   (4) $SnCl_2(C_5H_7O_2)_2$;
   (5) $SbCl_4(C_5H_7O_2)$;
   (6) $VO(C_5H_7O_2)_2$;
   (7) titanium tetrabutylate;
   (8) titanium dichloride diethyl;
   (9) iron cyclopentadienyl;
   (10) mercury acetate; and
   (11) the copper salt of phthalic acid monobutylester.

2. The process of claim 1 wherein the catalyst (B) is ferric acetyl acetonate.

3. The process of claim 1 wherein the catalyst (B) is iron cyclopentanone carboxylic acid ethyl ester.

4. The process of claim 1 wherein the catalyst (B) is $TiCl_2(C_5H_7O_2)_2$.

5. The process of claim 1 wherein the catalyst (B) is $SnCl_2(C_5H_7O_2)_2$.

6. The process of claim 1 wherein the catalyst (B) is $SbCl_4(C_5H_7O_2)$.

7. The process of claim 1 wherein the catalyst (B) is $VO(C_5H_7O_2)_2$.

8. The process of claim 1 wherein the catalyst (B) is titanium tetrabutylate.

9. The process of claim 1 wherein the catalyst (B) is titanium dichloride diethyl.

10. The process of claim 1 wherein the catalyst (B) is iron cyclopentadienyl.

11. The process of claim 1 wherein the catalyst (B) is mercury acetate.

12. The process of claim 1 wherein the catalyst (B) is the copper salt of phthalic acid monobutylester.

References Cited

UNITED STATES PATENTS

| | | | |
|---|---|---|---|
| 2,764,565 | 9/1956 | Hoppe et al. | 260—2.5 |
| 2,772,245 | 11/1956 | Simon et al. | 260—2.5 |
| 2,846,408 | 8/1958 | Brochhagen et al. | 260—2.5 |
| 2,916,464 | 12/1959 | Ebneth et al. | 260—2.5 |
| 2,933,462 | 4/1960 | Fischer | 260—2.5 |
| 2,948,691 | 8/1960 | Windemuth et al. | 260—2.5 |
| 3,054,759 | 9/1962 | Britain | 260—2.5 |
| 3,084,177 | 4/1963 | Hostettler et al. | 260—404.5 |
| 3,226,345 | 12/1965 | Saunders et al. | 260—2.5 |

FOREIGN PATENTS

| | | |
|---|---|---|
| 575,210 | 5/1959 | Canada. |
| 769,681 | 3/1957 | Great Britain. |
| 860,109 | 12/1952 | German. |

OTHER REFERENCES

Entelis et al., Journal of Cellular Plastics, pp. 360–363, August 1967 edition.

Britain, I & EC Product Research and Development, volume 1, No. 4, pp. 261–264, December 1962.

Mack, Reprint from "Modern Plastics," volume 42, No. 4, pp. 148, 150, 154, 158, 160, and 194 (December 1964).

DONALD E. CZAJA, *Primary Examiner.*

MICHAEL B. FEIN, *Assistant Examiner.*

U.S. Cl. X.R.

252—431; 260—75, 77.5